E. K. BAKER.
VEHICLE WHEEL.
APPLICATION FILED NOV. 16, 1912.
1,307,473.
Patented June 24, 1919.
3 SHEETS—SHEET 1.
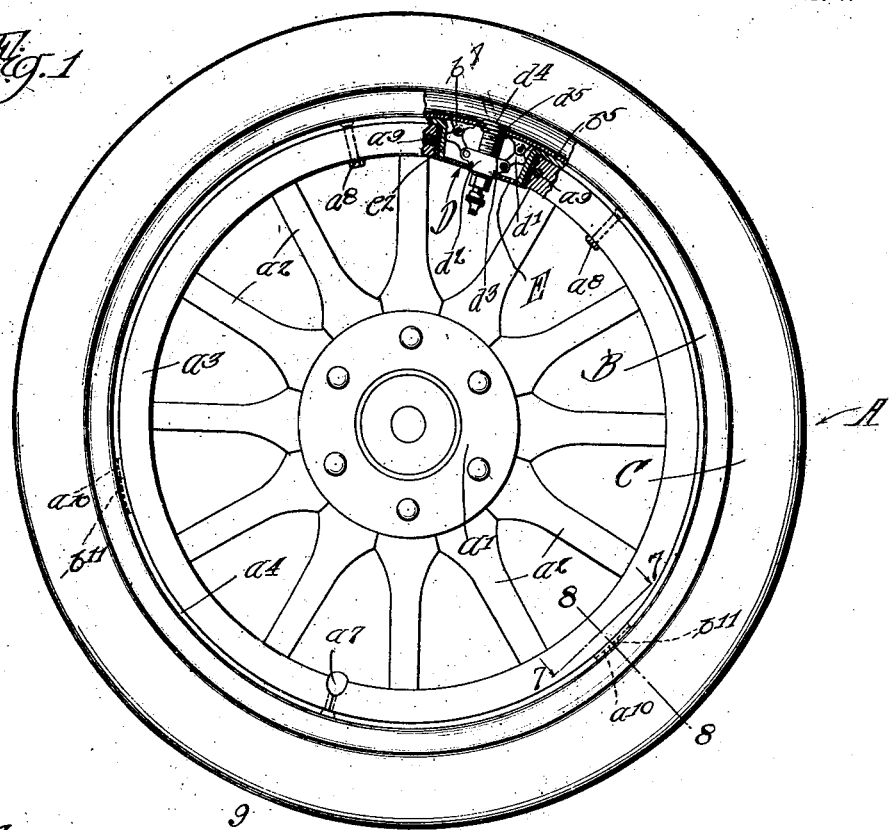
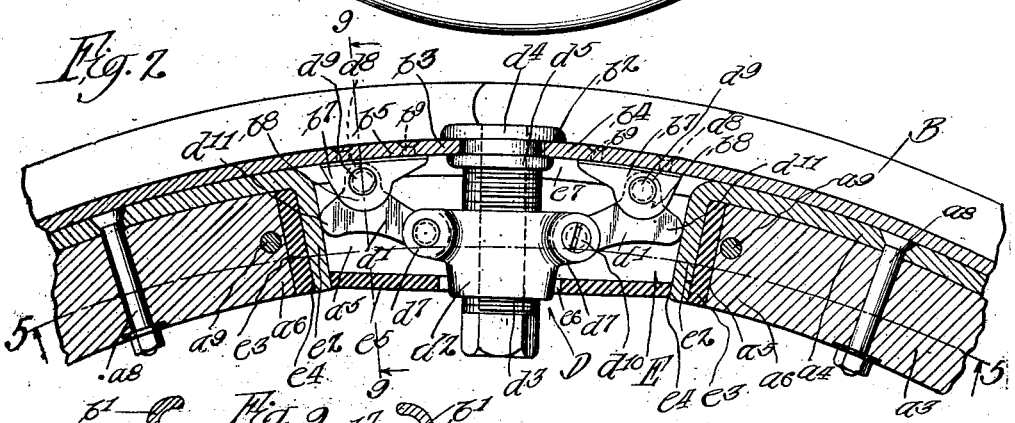
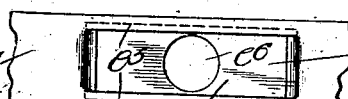

E. K. BAKER.
VEHICLE WHEEL.
APPLICATION FILED NOV. 16, 1912.
1,307,473.
Patented June 24, 1919.
3 SHEETS—SHEET 2.
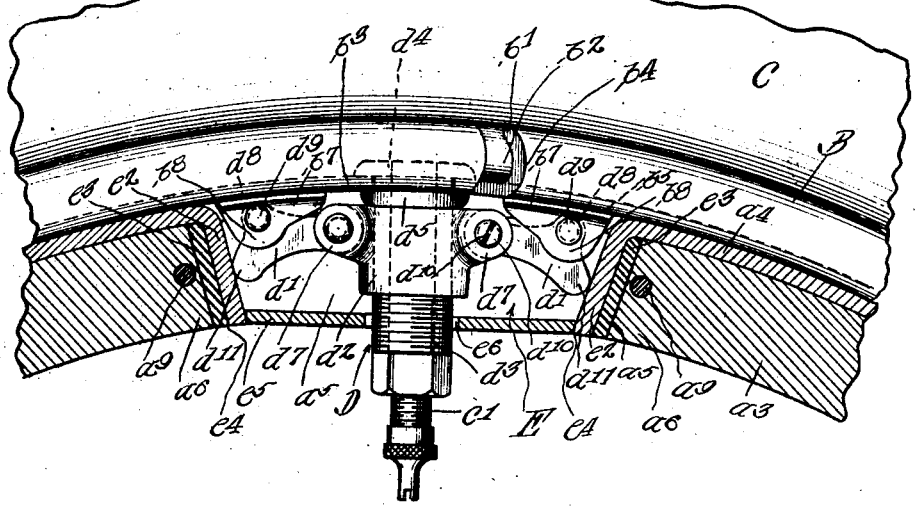
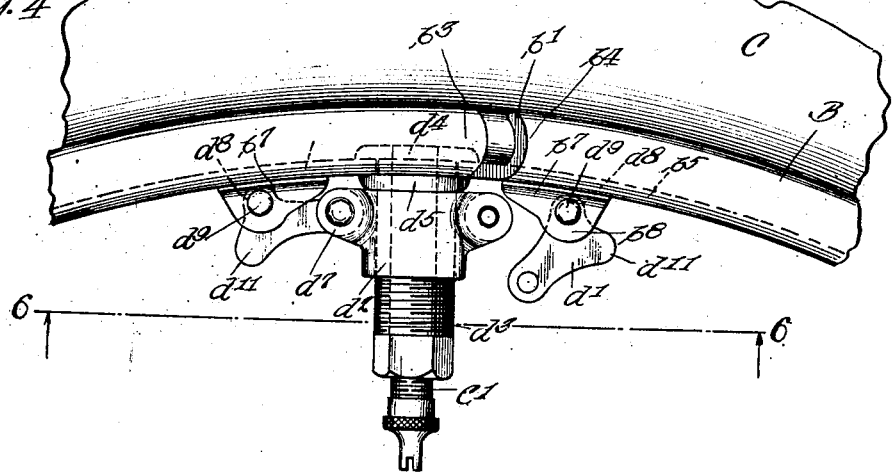

E. K. BAKER.
VEHICLE WHEEL.
APPLICATION FILED NOV. 16, 1912.
1,307,473.
Patented June 24, 1919.
3 SHEETS—SHEET 3.
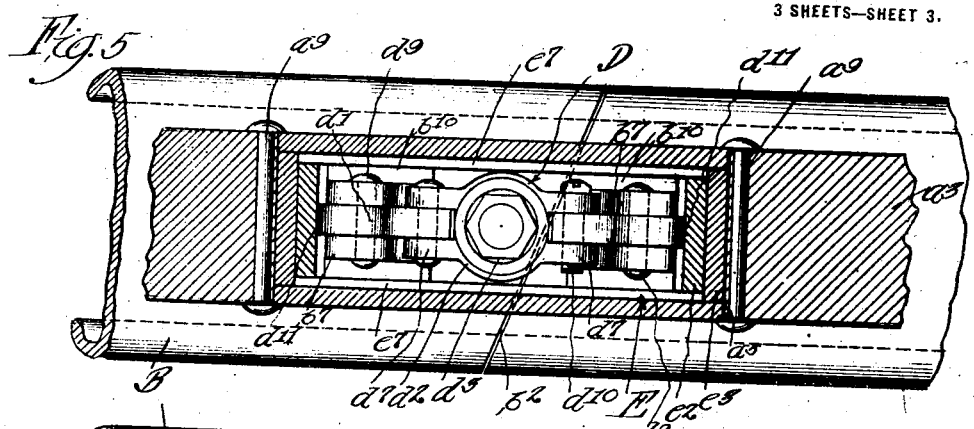
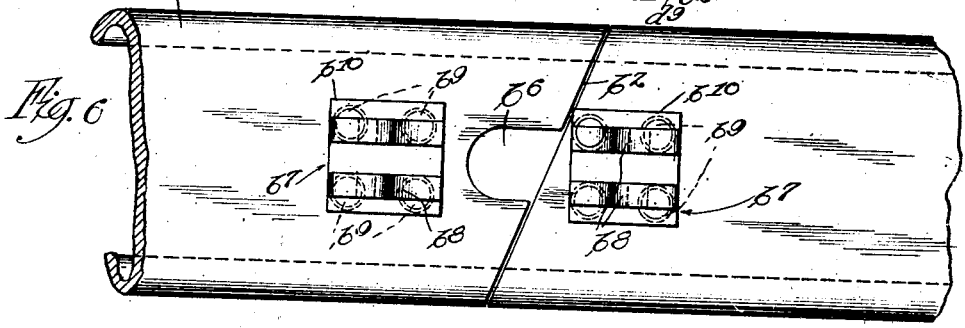
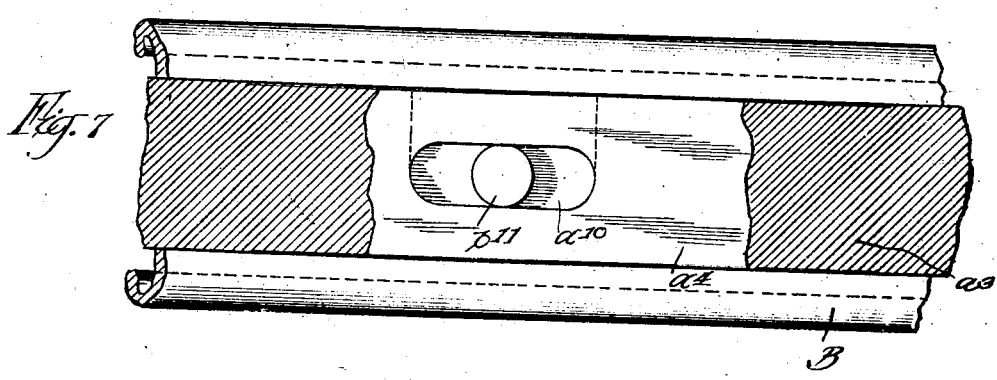
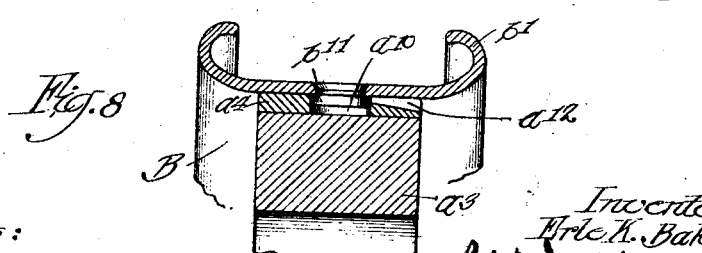
Witnesses:
Inventor:
Erle K. Baker.
by
Atty.

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

VEHICLE-WHEEL.

1,307,473.  Specification of Letters Patent.  Patented June 24, 1919.

Application filed November 16, 1912. Serial No. 731,682.

*To all whom it may concern:*

Be it known that I, ERLE K. BAKER, a citizen of the United States, and a resident of Chicago, Cook county, Illinois, have invented certain new and useful Improvements in Vehicle-Wheels, of which the following is a specification.

My invention relates to improvements in vehicle wheels and has particular reference to means for mounting and securing pneumatic tires and their rims upon and to wheels.

The object of my invention is to provide a vehicle wheel of the demountable rim type which shall be simple in construction, neat in appearance and relatively strong; in which the rim shall be seated upon a flat cylindrical periphery; the rim of which shall be capable of being easily and quickly contracted and seated in interlocked condition upon the wheel and which shall also be capable of being easily and quickly expanded, even under the pressure of the pneumatic tire, for removal from the wheel.

A further object of my invention is to provide a demountable rim and complementary wheel of neat, smooth and artistic appearance wherein the rim expanding and contracting devices shall be hidden from view.

A further object of my invention is to provide a rim contracting and locking mechanism which shall be capable of being easily operated to contract the rim with great force and which shall also serve to positively lock the rim in contracted condition. A further object of my invention is to provide a rim expanding and contracting mechanism which shall be permanently secured to the ends of the rim and which shall be centrally located between the side planes of the rim to the end that the forces applied, both to contract and expand the rim, shall not tend to distort either the rim or the mechanism.

A further object of my invention is to provide a split rim contracting and expanding mechanism and a complementary wheel upon which the rim is adapted to be seated, so arranged and associated that the rim is positively held tightly seated upon the felly band of the wheel in such condition that any wear between the rim and the felly band or any relative enlargement of the rim will be compensated for without loosening the rim upon the wheel.

My invention consists in a pneumatic-tire rim of the split type and a complementary wheel whereon the rim is adapted to be seated; the two having complementary interlocking parts whereby when the rim is contracted, it is held securely in position on the wheel, the rim ends being contracted by a rim expanding and contracting mechanism which occupies little space and yet is exceedingly strong, and the wheel being provided with a recess, pocket or casing in which the operating mechanism is received and by which it is protected and which coöperates with the mechanism for locking the rim in contracted condition upon the wheel.

My invention further consists in a rim expanding and contracting mechanism of unique construction by which the rim can be expanded or contracted, when either mounted on a wheel or when it is separate from a wheel.

My invention also consists in a peculiar construction of felly band by which a suitable pocket is provided to receive the rim operating mechanism, without reducing the strength of the felly band or wheel felly and without detracting from the ordinary neat appearance of the wheel.

My invention also consists in the various combinations and arrangements of elements and parts by which the above mentioned and other objects are attained and all as hereinafter described and particularly pointed out in the appended claims.

My invention will be more readily understood by reference to the accompanying drawings forming part of this specification, and in which—

Figure 1 is a side elevation, partly in section, of a pneumatic tired wheel, made in accordance with my invention;

Fig. 2 is an enlarged central circumferential section, of the rim part of the wheel, clearly illustrating the rim expanding and contracting mechanism;

Fig. 3 is a view somewhat similar to Fig. 2 but showing the rim in expanded condition;

Fig. 4 is a view similar to Fig. 3, but showing the rim operating mechanism disconnected and in condition to permit the removal of the tire from the rim;

Fig. 5 is a sectional view substantially on the line 5—5 of Fig. 2, showing an inside plan view of the rim operating mechanism and rim;

Fig. 6 is an inside view of the rim taken on the line 6—6 of Fig. 4, the operating mechanism being removed;

Fig. 7 is a circumferential section of the wheel on the line 7—7 of Fig. 1, the felly being broken away to show the interlock between the felly band and the rim;

Fig. 8 is an enlarged sectional view on the line 8—8 of Fig. 1;

Fig. 9 is a transverse sectional view of the felly band on the line 9—9 of Fig. 2, particularly showing the construction of the pocket; and Fig. 10 is an outer plan view of the felly band at the point where the pocket is formed.

I have selected a clencher tire and rim as a suitable type with which to illustrate my invention, but it will be at once apparent that my invention can be applied with equally beneficial results to tires and tire rims of other forms.

It will also be apparent that while I have illustrated my invention as being applied to a wheel mainly constructed of wood, many of the features and advantages of my invention are capable of being employed and will develop their desirable and useful functions when used in combination with metal wheels.

As shown in the drawings the wheel consists of a wheel proper A, a tire carrying rim B and a pneumatic tire C. The wheel proper consists of the usual hub $a^1$, spokes $a^2$, and a felly $a^3$. The felly carries and is surrounded by a metal felly band $a^4$ which is flat or cylindrical in form, and which serves the usual functions of a metal tire or rim on a wooden wheel. For the purpose of mounting the pneumatic tire C upon the wheel, I provide the tire rim B with flanges $b^1$ adapted to coöperate with the base of the tire to hold the tire upon the rim. At one point $b^2$ in the circumference of the rim I split or cut the rim on a diagonal line providing the rim with two ends $b^3$ and $b^4$. The rim being thus in the form of a split ring is free to expand or contract, and further the cut being on a diagonal, the ends of the rim can readily be separated transversely to aid in applying and removing the tire to and from the rim. Adjacent to this cut in the rim I mount upon the rim a rim contacting and expanding mechanism which I shall designate generally by D. This mechanism is adapted to link the severed ends of the rim together and is capable of being operated to force the ends of the rim apart and conversely to draw the ends of the rim together. I arrange this mechanism upon the inner surface of the rim and centrally between its sides, and I provide a pocket E in the felly of the wheel adapted to receive this mechanism and formed to cover and protect the mechanism when the rim is mounted in position upon the wheel. In the construction and use of devices of this character it is desirable that the mechanism be as substantial as possible, consistent with the restricted space necessarily occupied. Furthermore, it is desirable that the mechanism be capable of being easily and quickly repaired by the introduction of new parts in place of broken parts, and it will be seen that all of these desirable features are inherent in mechanism which embody my invention.

The rim operating mechanism D consists of a pair of toggle links $d^1$ which are adapted to link the two ends of the rim together, and which are adapted to be operated after the manner of a toggle lever to expand the rim with great force. These levers $d^1$ are linked together by means of a movable nut $d^2$ centrally arranged in reference to the levers and to the rim and mounted upon a hollow screw $d^3$ which is revolubly mounted in the base $b^5$ of the rim. I hold this hollow screw $d^3$ against longitudinal movement relatively to the rim by means of two thin circumferential flanges $d^4$ and $d^5$. The flange $d^4$ is at the inner end of the screw and is adapted to lie within the tire rim. The flange $d^5$ is separated from the flange $d^4$ sufficient to admit the base $b^5$ of the rim between them, and these flanges coöperate to hold the screw against longitudinal movement and to permit the screw to be freely rotated. I provide the base $b^5$ of the rim with an opening $b^6$ adapted to receive the shank of the screw $d^3$. This opening extends from the cut $b^2$ of the rim in a circumferential direction and forms a slot in which the screw $d^3$ can move to a limited extent, circumferentially of the rim when the rim is expanded or contracted. I provide on each end of the rim, and substantially equally spaced from the opening $b^6$ lugs $b^7$ by means of which I pivotally connect the toggle links $d^1$ to the rim. To connect the movable nut $d^2$ to the toggle links $d^1$, I provide oppositely disposed pairs of ears $d^7$ on the inner end of the nut and spaced apart to receive the links $d^1$ between them. I provide each of the lugs $b^7$ with a pair of parallel inwardly extending ears $b^8$ spaced apart to receive the outer ends $d^8$ of the links $d^1$, and the links are pivotally mounted or connected to the lugs $b^7$ by means of transversely disposed pivots $d^9$. One of the links $d^1$, the one which connects the nut $d^2$ with the slotted end of the rim $b^3$ is permanently mounted in position, the pivots being preferably riveted over on their ends. The other link is removably connected to the nut $d^2$ by means of a screw $d^{10}$, whereby this link may be readily disconnected from the nut $d^2$ when it is desired to spread the ends of the rim transversely to remove the tire casing from the rim.

As clearly shown in Fig. 3, it will be seen that when the screw $d^2$ is rotated to force the nut $d^2$ toward the inner end of the screw and against the collar $d^5$ the mechanism serves as an expanding toggle strut to forcibly separate the ends of the rim and thereby to expand the rim and enlarge its diameter. I so arrange the various parts of the mechanism that as the nut approaches the inner limit of its movement the link centers or pivots approach to a straight line arrangement whereby the expanding power of the mechanism is very great. I secure each of the lugs $b^7$ to the rim, preferably by four rivet-like projections $b^9$ which are adapted to enter suitable openings formed in the base $b^5$ of the rim, and these projections are then riveted down on the inside of the rim to hold these lugs securely in place. The slot $b^6$ in the rim which I provide for the adjusting screw $d^3$ permits the easy assembling of the screw with the rim as the screw can be entered from the cut end of the rim and moved longitudinally into its position.

To provide the pocket E in such a manner that neither the felly $a^3$ of the wheel nor the felly band $a^4$ will be weakened, I cut a section of the felly out to provide a space $a^5$ for the reception of the casing of the pocket in such a manner that the original strength of the felly band is not diminished at the point where the rim operating mechanism is situated.

I first make an open topped box which when it is received in position in the felly band forms the casing E which is equal, transversely and radially with the cross sectional dimensions of the felly $a^3$. This box is arranged, in relation to the felly band, with its open top against the inner surface of the band and in such relation that when the band is placed upon the wheel, the casing E fills the gap or opening $a^5$ in the felly previously described. In other words, this box is long enough to form an abutment between the ends $a^6$ of the felly which form the ends of the gap $a^5$ and the felly is thereby braced against collapse. To secure this box to the felly band and to provide an opening in the felly band through which the mechanism can be inserted, when it is desired to mount the rim upon the wheel, I provide a slot or opening $e^1$ in the felly band by cutting oppositely extending tongues $e^2$ which are less than the width of the face of the felly band and then I depress or bend these tongues inwardly to form the opening $e^1$ in the felly band between them. I make this opening of such an extent, circumferentially of the band, that when the ends $e^2$ are bent radially inward they lie flat against the inner faces of the end walls $e^3$ of the box E. To secure the box to the felly band, I provide transverse openings $e^4$ in the bottom wall $e^5$ of the box and adjacent to the inner face of the end walls $e^3$ through which the inner ends of the tongues $e^2$ project and then I secure these tongues in the openings $e^4$ by some suitable means as riveting or welding them in position.

The box E therefore forms an integral part of the felly band and serves to complete the felly band at this point. The slot $e^1$ is centrally disposed in the felly band and not being the full width of the felly band, the felly band is not completely severed at this point but is provided with connecting bars $e^6$ which in conjunction with the box E provides a felly band which is as strong at this point as at other points in its circumference. The rectangular box form of the casing E which, as already explained completes the felly at this point, results in a wheel which is substantially of equal strength throughout its circumference. The box or casing is provided with a central opening $e^7$ in its bottom wall adapted to receive the inner end of the screw $d^3$ and I preferably make it large enough to admit the inner end of the movable nut $d^2$ so as to provide for sufficient movement of the nut to properly expand and contract the rim. This chamber or box E not only serves to contain, cover and protect the contracting and expanding mechanism D but it also has an additional function in the locking of the rim in contracted condition. The rim is contracted when the screw $d^3$ is rotated to draw the nut $d^2$ inwardly, the links $d^1$ at such times serving to draw the ends of the rim together, and at such times these links are rotated upon their outer pivots $d^9$ and I provide abutting projections $d^{11}$ on the outer ends of the links $d^1$ which projections are adapted to bear against the end walls $e^3$ of the chamber or box E and cause the links $d^1$ to act as levers to positively force the ends of the rim together and to positively hold the ends of the rim against separation.

I preferably so proportion the rim and the wheel that when the rim is seated upon the wheel, as shown in Figs. 2 and 5, the ends of the rim are normally slightly separated, consequently should any wear occur between the rim and the felly band, or should the rim for any reason stretch, or should it be expanded by changes of temperature, the ends of the rim can approach each other and the rim can be thereby maintained in close contact with the outer surface of the felly band. Should this wear or extension of the rim occur, the pressure of an inflated pneumatic tire upon the rim, which aggregates several tons, will keep the rim compressed tightly on its seat.

The felly band is secured in place upon the wheel by a tire bolt $a^7$ arranged diametrically opposite to the box E and by two tire bolts $a^8$ spaced apart, one on each side of the box E. I further secure the felly band and the box E to and upon the wheel by means of rivets $a^9$ which extend transversely through the felly, one at each end of the box, the rivet ends or heads overlapping the side faces of the box and serving to prevent any relative transverse movement of the box and the ends of the felly.

The base $b^{10}$ of each of the lugs $b^7$ is of such a width that it fits between the sides $e^7$ of the felly band and prevents the transverse movement of the rim at this point in its circumference, and to further secure the rim upon the felly band I provide the rim with two inwardly projecting lugs or pins $b^{11}$ arranged on the opposite side of the wheel from the expansion mechanism and spaced apart circumferentially, and I provide the felly band with centrally arranged elongated slots $a^{10}$ to receive these pins or projections. The projections $b^{11}$ are quite short and consequently when the rim is slightly expanded the projections will be withdrawn from the slots $a^{10}$ and the rim will be free to be withdrawn at these points from the wheel.

For the purpose of facilitating the entering of the lugs or projections $b^{11}$ into the slots $a^{10}$, I chamfer the felly band at points adjacent to the slots $a^{10}$ as shown at $a^{12}$ Fig. 8, tapering the chamfer from the outer edge of the felly band to the slot whereby the felly band does not interfere with the easy and free insertion of the projections $b^{11}$ into the slots $a^{10}$. The hollow screw $d^3$ serves as a mounting for the tire valve $c^1$ which is adapted to project through this hollow screw when the tire is placed upon the rim and serves to permit the inflation and deflation of the tire when the tire is on the rim.

My improved rim not only serves to mount the tire upon the wheel but it is in itself, in a sense, a complete tire carrier and is adapted to have the tire placed upon it, the rim being in expanded condition and then the tire inflated to working pressure, in this condition the tire may be carried for instant use upon a wheel in case of necessity. It is merely necessary to remove a rim with its tire from the wheel and replace it with an inflated tire and its rim. My rim also lends itself admirably to the rapid or quick repairing of tires, for the reason that once the rim has been removed from the wheel the rim can be contracted until the ends of the rim contact upon each other and then the expanding mechanism can be disconnected by the removal of the screw $d^{10}$ and then the tire can be removed from the rim, the diagonal cut $b^2$ aiding in this operation in a well known manner.

To effect an interchange of an inflated tire for a deflated one, the screw $d^3$ is rotated to force the nut $d^2$ toward the rim and the rim is thereby expanded. This expansion is sufficient to allow the projections or pins $b^{11}$ to escape from the slots $a^{10}$ when the rim diametrically opposite from the expansion device can be moved transversely to free the rim from the wheel. This having been done, the rim and its tire can be moved bodily transversely to the wheel, and the expanding mechanism will thereby be withdrawn from the box E thereby freeing the rim and the tire from the wheel. In placing a rim and tire upon the wheel, the rim is first brought to its expanded condition. The expansion mechanism is first entered into the box E and then the opposite portion of the rim is brought into alinement with the wheel so that the projections $b^{11}$ can be entered into the slots $a^{10}$. The rim is held in such position that the projections are retained in the slots and the adjusting screw $d^3$ is turned to draw the ends of the rim together and thereby contract the rim upon the wheel.

It will now be clear that my demountable rim and its complementary wheel present a neat and compact appearance, that the mechanism is exceedingly strong, both to expand the rim even against the pressure of the tire and to quickly, firmly and positively contract the rim to its firmly seated condition. It will further be clear that the operation of my mechanism is exceedingly simple and that it can be quickly and positively operated to secure the results desired. Furthermore, the strains developed within the various parts are all in direct central and balanced alinement so that no distorting or deflecting strains are produced in any of the parts, and it is clear that when it is desired to remove a tire casing from the rim it is necessary to remove but one screw to disconnect the ends of the rim so that they can be freely separated transversely from each other to permit the easy removal of the tire from the rim.

As many modifications of my invention will readily suggest themselves to one skilled in the art, I do not limit or confine my invention to the specific structures herein shown and described.

I claim:

1. A demountable split tire-rim, in combination with a wheel, rim expanding and contracting mechanism spanning the split and projecting inwardly from the rim, said wheel having a box-like chamber adapted to receive and inclose the mechanism, said mechanism including a system of operative toggles adapted to expand and contract the rim, oppositely disposed projections on said toggles adapted to contact with the opposite ends of said box to force and hold the rim ends toward each other.

2. A tire rim in the form of a ring split or severed at one point in its circumference, in combination with a movable member arranged within the rim and adjacent to the cut, links and pins connecting the movable member to the rim ends for opening and closing the rim, one of the pins being easily removable to disconnect the rim ends, and means for adjusting the position of said member relatively to the rim and for holding it in its adjusted position.

3. A demountable transversely split tire rim, in combination with a wheel, rim expanding and contracting mechanism spanning the split and projecting inwardly from the rim, said wheel having its felly cut away to receive said mechanism, and the mechanism including a system of operative toggles adapted to expand and contract the rim, oppositely disposed projections on said toggles adapted to contact with the end portions of the felly defining said opening to force and hold the rim ends toward each other.

4. A demountable transversely split tire rim, in combination with a wheel, rim expanding and contracting mechanism spanning the split and projecting inwardly from the rim, said wheel having its felly cut away to receive said mechanism and the mechanism including a system of operative toggles adapted to expand and contract the rim, oppositely disposed projections on said toggles adapted to contact with the end portions of the felly defining said openings to force and hold the rim ends toward each other, and metallic means covering said felly ends against which the toggle mechanism contacts.

In testimony whereof I have hereunto set my hand this 12th day of November, 1912, in the presence of two subscribing witnesses.

ERLE K. BAKER.

Witnesses:
  EDWARD F. WILSON,
  L. A. PLAGGE.